United States Patent
Axelsson et al.

(10) Patent No.: US 11,168,727 B2
(45) Date of Patent: Nov. 9, 2021

(54) ATTACHMENT DEVICE

(71) Applicant: MAFI AB, Mora (SE)

(72) Inventors: Andreas Axelsson, Malung (SE); Jonas Wassdahl, Mora (SE)

(73) Assignee: MAFI AB, Mora (SE)

( * ) Notice: Subject to any disclaimer, the term of this patent is extended or adjusted under 35 U.S.C. 154(b) by 398 days.

(21) Appl. No.: 16/303,396

(22) PCT Filed: May 29, 2017

(86) PCT No.: PCT/SE2017/050567
§ 371 (c)(1),
(2) Date: Nov. 20, 2018

(87) PCT Pub. No.: WO2017/204742
PCT Pub. Date: Nov. 30, 2017

(65) Prior Publication Data
US 2020/0318674 A1    Oct. 8, 2020

(30) Foreign Application Priority Data
May 27, 2016    (SE) ................... 1650734-5

(51) Int. Cl.
*F16B 37/04*    (2006.01)
*F16B 7/18*    (2006.01)
(Continued)

(52) U.S. Cl.
CPC ............ *F16B 37/047* (2013.01); *F16B 7/187* (2013.01); *F16L 3/1091* (2013.01); *F16B 37/04* (2013.01);
(Continued)

(58) Field of Classification Search
CPC ........ F16B 7/187; F16B 37/00; F16B 37/044; F16B 37/045; F16B 37/046; F16B 37/047; F16B 37/061; F16B 37/04; F16L 3/1091
(Continued)

(56) References Cited

U.S. PATENT DOCUMENTS 1,099,272 A  *  6/1914  Unruh .................... F16B 37/02
                                                        411/259
1,570,565 A  *  1/1926  Hanner ................... F16B 37/00
                                                        411/333
(Continued)

FOREIGN PATENT DOCUMENTS

DE    1287174    1/1969
DE    3922624    5/1990
(Continued)

*Primary Examiner* — Roberta S Delisle
(74) *Attorney, Agent, or Firm* — Duane Morris LLP; Gregory M. Lefkowitz; Randall C. Pyles

(57) ABSTRACT

An attachment element for assembly on a tubular element including an upper assembly sheet metal which includes in its outer end a transversal, upward directed mounting flange in relation to the assembly sheet metal which includes a cut out geometry, a lower sheet metal, a spacer element which link the upper assembly sheet metal together with the lower sheet metal in its interior ends and the spacer element includes attachment devices provided on both sides of an abutting section of the tubular element. The spacer element includes a wavelike geometry design which form the abutting section and the attachment devices. A galvanized barrel nut barrel nut including a barrel with a first and second interior diameter is also disclosed.

4 Claims, 3 Drawing Sheets

(51) Int. Cl.
*F16L 3/10* (2006.01)
*F16B 37/06* (2006.01)

(52) U.S. Cl.
CPC ........... *F16B 37/044* (2013.01); *F16B 37/046* (2013.01); *F16B 37/061* (2013.01)

(58) Field of Classification Search
USPC .................................. 411/104, 427, 432, 924
See application file for complete search history.

(56) References Cited

U.S. PATENT DOCUMENTS

| | | | | | |
|---|---|---|---|---|---|
| 2,550,001 | A | * | 4/1951 | Button | F16L 3/1091 248/49 |
| 2,672,659 | A | * | 3/1954 | Becker | F16B 37/04 403/20 |
| 2,826,631 | A | * | 3/1958 | Rohe | F16B 37/00 174/138 R |
| 3,345,452 | A | * | 10/1967 | Logan | H01R 4/186 174/71 R |
| 4,557,649 | A | * | 12/1985 | Jeal | F16B 37/062 411/40 |
| 4,799,641 | A | * | 1/1989 | Koreski | F16L 3/2235 24/329 |
| 4,928,911 | A | * | 5/1990 | Hardtke | F16L 3/1016 248/230.5 |
| 5,456,433 | A | | 10/1995 | Burns et al. | |
| 7,726,927 | B2 | * | 6/2010 | Cook | F16B 35/005 411/398 |
| 2005/0117992 | A1 | * | 6/2005 | Evenrud | F16B 5/0241 411/107 |
| 2010/0170163 | A1 | | 7/2010 | Tarbell et al. | |
| 2010/0288897 | A1 | | 11/2010 | Chang | |
| 2011/0108695 | A1 | | 5/2011 | Wang | |
| 2011/0194913 | A1 | | 8/2011 | Lewis et al. | |
| 2011/0311334 | A1 | * | 12/2011 | Making | C23C 8/22 411/427 |
| 2012/0001041 | A1 | | 1/2012 | Yang et al. | |
| 2012/0144760 | A1 | | 6/2012 | Schaefer et al. | |
| 2014/0369787 | A1 | * | 12/2014 | Hill | F16B 5/0642 411/368 |
| 2016/0010679 | A1 | | 1/2016 | Makino et al. | |

FOREIGN PATENT DOCUMENTS

| | | | |
|---|---|---|---|
| DE | 202012012290 | 1/2013 | |
| DE | 102011117629 | 5/2013 | |
| DE | 202014103897 | 9/2014 | |
| EP | 2913535 | 9/2015 | |
| FR | 2532015 B1 * | 5/1989 | ............. F16B 29/00 |
| GB | 2120310 | 11/1983 | |
| WO | 02/31910 | 4/2002 | |
| WO | 2012023646 | 2/2012 | |

* cited by examiner

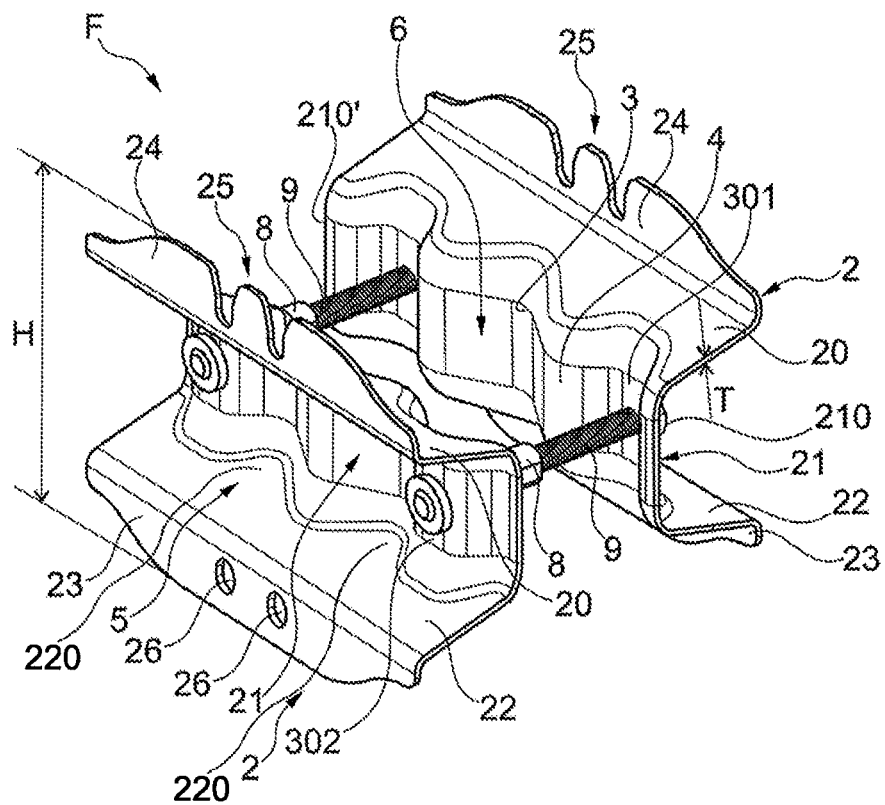

ATTACHMENT DEVICE

CROSS-REFERENCE TO RELATED APPLICATIONS

This application is a § 371 national stage entry of International Application No. PCT/SE2017/050567, filed May 29, 2017, which claims priority to Swedish Patent Application No. 1650734-5, filed May 27, 2016, the entire contents of which are incorporated herein by reference.

TECHNICAL FIELD

The present invention relates to an attachment element for assembly onto a tubular element comprising a upper assembly sheet metal which comprises in its outer end a transversal, upward directed mounting flange in relation to the assembly sheet metal which comprises a cut out geometry, a lower sheet metal, a spacer element which link together the upper assembly sheet metal with the lower sheet metal in its interior ends and the spacer element comprises attachment devices provided on both sides of an abutting section of the tubular element. Also, the invention relates to a galvanized barrel nut comprising a head and one from the head extending barrel. Also, the invention relates to an attachment device for assembly onto a tubular element.

BACKGROUND ART

Nowadays when telecom equipment such as radio boxes and antennas are to be mounted, these structures are often assembled on masts, pillars etc.
The telecom equipment is usually mounted on a supporting tube which later is provided on the mast or the like. One solution used nowadays, to attach equipment to tubes, is for example the attachment device provided by the applicant with community design registration no. 002439273-0001. When this device is used, multiple screws are enclosed, which are of varying length, this since the length of the screw is adapted after the diameter of the supporting tube so that the screw not shall project and be in the way for the equipment which is to be hooked onto the attachment device. It is tiresome when the attachment device is to be attached to the tube, to keep the attachment device in the correct position at the same time as both nut and screw is to be held and fastened and it is easily done that a small nut is lost. It is also customary to adapt the size of the attachment device after the diameter of the current supporting tube.

SUMMARY OF INVENTION

It is an object of the present invention to provide an attachment device which overcomes or at least mitigate the drawbacks with the above described problems. This can be achieved by means of an attachment device according to the invention.

Thanks to the invention an attachment device is offered which can be used onto supporting tubes with a great diameter variation of the tube and that it is easy to fix the attachment device to the tubular element and that projecting screws are avoided. The attachment device is especially advantageous at assembly on round supporting tubes but also result in advantages at mounting on supporting tubes with cornered cross section.

According to one aspect of the invention the attachment device comprises an attachment element for assembly on a tubular element comprising an upper assembly sheet metal, a lower sheet metal, a spacer element which link the upper assembly sheet metal together with the lower sheet metal in its interior ends and the spacer element comprises attachment devices provided on both sides of an abutting section of the tubular element. The spacer element comprises a wavelike geometry design which form said abutting section which provide the advantage that the attachment device can be arranged on a large variation of tube diameters.

According to another aspect of the invention the attachment element comprises stiffening sections which connect adjacent wall sections at the wavelike geometry design which allows a relatively thin sheet metal to be used yet achieve sufficient strength.

According to another aspect of the invention, the abutting section extend between the upper assembly sheet metal and the lower sheet metal and comprises two opposite wall portions which are provided with an angle in between which forms a centrally located wave trough and where said angle is in the range 20-200 degrees which achieves a stable abutting surface towards the tubular element and that the abutting section is suitable for element diameters with a large span width.

According to another aspect of the invention the attachment element comprises a distance in between its attachment devices and an intersection point for the two opposite wall portions at the centrally arranged wave trough which is at least equal in length as the radius of the tubular element so that the tubular element shall not be in the way when the attachment device is fixed around the tubular element.

According to another aspect of the invention, the upper assembly sheet metal, comprises in its outer end a transversal, upward directed mounting flange in relation to the assembly sheet metal which comprises a cut out geometry which facilitates attachment of equipment.

According to another aspect of the invention, the lower sheet metal comprises, in its outer end, a transversal mounting sheet metal in relation to the lower sheet metal which preferably extend downward in vertical direction and comprises two through holes such that the equipment can be fixed onto the attachment device.

According to yet another aspect of the invention, the attachment element is preferably manufactured by means of a compression moulding process which achieves advantages at the manufacturing such as it is simple, fast and that it is cost-efficient. Manufacturing which comprises bending is also an option and casting or other shaping operations which are known to the skilled person in the field.

According to another aspect of the invention the attachment device comprises a galvanized barrel nut comprising a head and one from the head extending barrel where a distally located section of said barrel has a first interior diameter which is smaller than a second interior diameter at a remaining barrel section and where the distally located section comprises internal threads which achieves the advantage that the barrel nut has the function of an extended nut and one and the same length of the screw can be used at fixing of the attachment device onto tubular elements comprising different diameters.

According to yet another aspect of the invention the head of the galvanized barrel nut comprises a through hole with a diameter which is at least as large as the second interior diameter of the barrel and which is connected to interior of the barrel, and the barrel nut comprises a axial crew hole which extends through the whole barrel nut which achieves the advantage that when the attachment device is to be fixed around a tubular element with a small diameter the screw may extend through the whole barrel nut and out through the head such that the same length of the screw may be used to a variety of different diameters of the tubular element.

According to an additional aspect of the invention, the internal threads are not galvanized but when the distally arranged section of the barrel nut constitute at most 50% of the length of the barrel it is ensured that a screw always is provided within the internal threads which protects against for example corrosion.

According to another aspect of the invention the barrel of the barrel nut comprises two external opposite chamfered planes which extend from the interior end of the barrel along the whole or substantially the whole barrel, thanks to the chamfered planes the barrel nut is locked against rotation in the attachment device of the attachment element which in turn leads to that the work of the installer is facilitated.

According to another aspect of the invention the head of the barrel nut has the shape of a frustum of a cone of which the widest position is distally located from the barrel part which leads to that the barrel nut is self-locking in the attachment device of the attachment element and this facilitates for the installer to fix the attachment device around the tubular element.

BRIEF DESCRIPTION OF DRAWINGS

The invention is described below, by way of example, with reference to the accompanying drawings, in which:

FIG. 1 shows a perspective view of an attachment device according to the invention, FIG. 2 shows a view from above of the attachment device according to the invention.

DESCRIPTION OF EMBODIMENTS

Figure 3:
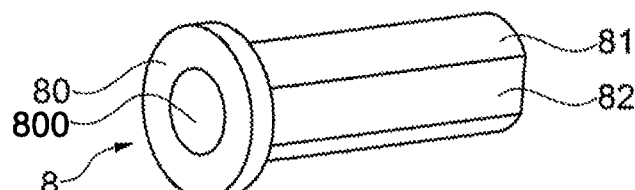
FIG. 3 shows a perspective view of the barrel nut according to the invention.

The following detailed description and the examples described therein, has only as purpose to describe and illustrate a certain design of the invention and is not intended to in any way limit scope of the invention. Information regarding directions refer to the invention mounted on a vertical tubular element.

FIG. 1 shows an attachment device F according to the invention in a preferred embodiment. The attachment device F is shown in a perspective view and comprises two attachment elements 2, two screws 9 and two barrel nuts 8. The attachments device F is mainly used at mounting of telecom equipment at/onto tubular elements but it does not exclude that it may be used within other areas such as display of advertisements etc. The attachment element 2 of the attachment device are mirror-inversely provided on opposite side of a tube, a pillar or the like where about it is tightened, shown in FIGS. 8 and 9, such that equipment then may be hooked onto the attachment device F.

The attachment element 2 is preferably constituted by bent steel sheet and comprises an upper assembly sheet metal 20, a lower sheet metal 22 and a spacer element 21. The spacer element 21 link the upper assembly sheet metal 20 together with the lower sheet metal 22 by means of their interior ends. Further, the attachment element 2 comprises an outer side 5 which faces away from the tube whereupon the attachment device F is to be attached to, and an inner side 6 facing inwards towards the tube R which the attachment device F is to be attached to. The attachment element 2 has a length L in the range 100-500 mm, preferably in the range 150-350 mm and more preferably in the range 200-300 mm. Further, the attachment element 2 has a height H in the range 50-500 mm, preferably in the range 80-350 mm and more preferably in the range 100-200.

The spacer element 21 comprises a wavelike geometry design 3, 4 which wavelike geometry design form an abutting section 302 for the tubular element R which the attachment device F is to be fixed onto and attachment devices 210 provided on each side of the abutting section 302. The geometry design 3, 4 comprises three wavelengths and begins and ends with a crest of a wave 4 in its outer edges, the crests of the waves 4 are directed toward the tubular element R the attachment device is going to be attached to. Therewith the geometry design 3, 4 comprises three wave troughs 3 between said crests of waves 4, where the centrally situated wave trough 3 forms said abutting section 302 which extends between the upper assembly sheet metal 20 and the lower sheet metal 22. The abutting section 302 comprises two opposite wall sections 30, 30' which are provided with an angle V in between. The angle V is in the range 20-200 degrees, preferably in the range 40-180 degrees and more preferably in the range 60-150 degrees, shown in FIG. 2. The wave troughs 3 are facing away from the tube R, to which the attachment device F is going to be attached to.

Figure 7:
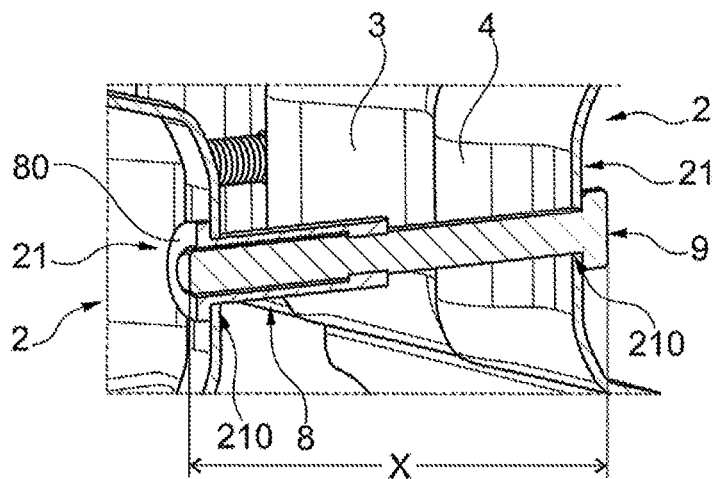
FIG. 7 shows a cross section of an attachment device according to the invention seen obliquely from the side.

The both wave troughs 300 provided on the sides situated on both sides of the centrally situated wave trough 3 differ from the design since they comprise a flat section 301, which flat section constitute the bottom of the wave trough 301, and which is provided on the sides and extend vertically along the complete wave trough. The attachment devices 210 are provided in the flat portion 301 and are preferably constituted by oval, through holes, shown in FIGS. 7, 8 and 9. The attachment devices 210 are provided to interact with a screw 9 and a barrel nut 8 according to the invention which will be described in detail in the description below. The through holes 210 are slightly oval tin shape this to match against a barrel nut 8 which is described in relation to FIGS. 3 and 4. The wave troughs 300 provided on the sides also comprise the two opposite wall portions 31, 31'.

The upper assembly sheet metal 20 and the lower sheet metal 22 also comprises stiffening portions 200, 220 which connect adjacent wall portions 30, 31 ';30', 31 within the wavelike geometry design 3, 4. The stiffening portions 200, 220 intervene with the outside 5 of the wavelike geometry design 3, 4. Preferably the stiffening sections 200, 220 are provided such that they connect the upper assembly sheet metal 20 and the lower sheet metal 22, respectively, with upper and lower side edges, respectively, of the wavelike geometry design 3, 4, such that the upper assembly sheet metal 20 and the lower sheet metal 22 run in one sweep together with the stiffening portions and the geometry design.

Between the through holes 210 provided in the sides of the wave troughs 300 and an intersection point for the two opposite wall portions 30, 30' of the centrally arranged wave trough 3, shown in FIG. 2, there is a distance Z. The skilled person understands that this distance may be adapted to the diameter of the tubular element R, onto which the attachment element 2 is to be mounted such that the screw and the barrel nut 8 can pass outside the tubular element R during assembly. The distance Z is preferably at least equal in length as the sum of the radius for the largest tubular element R which the attachment device is intended to be fixed onto and the radius of the barrel nut 8. Preferably, the distance Z is slightly larger such that a certain clearance between the tubular element R and the screw 9 and the barrel nut 8 is guaranteed. When a tube with a diameter of 150 mm is used, it might be suitable with a distance of 200 mm between the through holes, i.e. the distance Z is in this case 100 mm. When a tube with a diameter of 1 15 mm it might be suitable with a distance of ca. 130 mm between the through holes, i.e. the distance Z is in this case 65 mm. The advantage with a small distance between the screws is mainly because it is desired to mitigate any possible deformation at application of a prestressing force.

The upper attachment sheet metal 20 of the attachment element 2 extends outward and slope upward from the spacer element 21. In the outer end of the upper attachment sheet metal 20 an upper mounting flange 24 extends upward in vertical direction, at which mounting flange 24 the equipment is provided. In the described example the mounting flange 24 is provided with a cutout geometry 25 consisting of two cavities with an intermediate, directed upward in vertical direction, projecting part, which geometry 25 is adapted after a certain equipment which is to be hooked thereon. The skilled person realizes that the design of the mounting flange 24 and geometry 25 of the mounting flange is adapted after the current equipment which is to be hooked thereon.

The lower sheet metal 22 of the attachment element 2 extends mirror-inverted in relation to the upper mounting sheet metal 20, in other words outward and sloping slightly downward from the spacer element 21. Even if the lower sheet metal 22 comprises in its outer end a transversal lower mounting flange 23 in relation to the lower sheet metal which preferably extend downward in vertical direction. In this example the lower mounting flange 23 comprises two slightly oval through holes 26, shown in FIGS. 8 and 9, which holes is provided to attach the equipment onto the attachment element. The skilled person realizes that also the lower mounting flange 23 might be varied in its design to be adapted after the current equipment which is to be hooked thereon. The upper mounting sheet metal 20 and the lower sheet metal 22 contribute to that the attachment element 2 becomes more sturdy and endure more.

Figure 4:
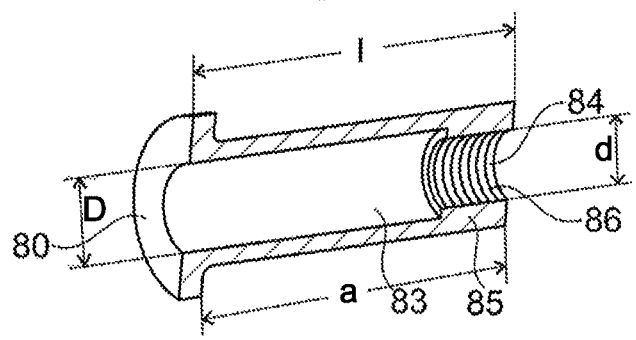
FIG. 4 shows a cross section of the barrel nut according to FIG. 3.

To attach the attachment elements 2 to each other, in a simple way and around a tubular element R, the invention also comprises also a barrel nut 8, shown in FIGS. 3 and 4, preferably a galvanized barrel nut. Nowadays when different attachment devices are used, several screws are enclosed, with varying lengths, so that the assembler may choose accurate length of the screw depending on the diameter of the tube. Thanks to the invention a screw with a certain length is enclosed which can manage a great diameter variation of the tube R.

In FIG. 3 a first barrel nut 8 according to the invention, which nut comprises a head 80 and a barrel which extends from the barrel 81. In FIG. 4 it is shown a section of the barrel nut 8 according to FIG. 3. A distally arranged part 85 of the barrel 8 has a first interior diameter d which is smaller than a second interior diameter D of the remaining barrel part 83, shown in FIG. 4. The distally arranged part 85 comprises internal threads 86. Further, the head 80 comprises a through hole 800 which hole has a diameter which is at least as large as the second inner diameter D of the barrel. The trough hole 800 is connected with the interior of the barrel and the barrel nut 8 comprises an axial screw hole which extend through the complete barrel nut 8. The distally arranged part 85 constitute at most 50% of the length a of the barrel more preferably max 30% of the length a of the barrel. In FIG. 3 it is shown that the head 8 is completely circular which is advantageous seen out of a manufacturing and cost perspective but the skilled person realizes that the head 80 also may have other designs, for example hexagonal. The barrel 81 comprises two external opposite chamfered planes 82 which extend from the interior end of the barrel along the whole barrel 81. Interior is interpreted as the end which is directed towards the tubular element R. The chamfered planes 82 are provided to match into the longer sides of the slightly oval through holes 210 of the attachment elements 2 such as when a screw 9 is screwed into the barrel nut 8 the barrel nut 8 cannot be rotated. The barrel nut 8 is consequently locked against rotation thanks to the chamfered planes 82. In this way, it is more easy to provide the attachment device F around a tube R when the installer does not need to fit the screw towards a nut which may be tiresome, if the screw is fitted into the barrel nut 8 according to the invention it is enough that the installer screws on the screw 9 and the installer does not need to hold a nut or the like. The skilled person realizes that the chamfered planes 82 does not need to extend along the whole barrel 81 all the way to the head 80 even if it is preferable since the head 80 then abuts against the attachment element 2 and this achieves a favorable distribution of the prestressing force.

The barrel nut 8 comprises a length l in the range 20-100 mm, preferably in the range 30-80 mm and more preferably in the range 40-60 mm. The screw 9 has a length X in the range 50-200 mm, preferably in the range of 70-150 mm and more preferably in the range 80-100 mm. In the examples, which are shown in the figures the barrel nut 8 has a length l of 45 mm and the screw 9 has a length X of 9 mm. With these lengths, the attachment device F according to the invention can be used together with supporting tubes R comprising a diameter in the span of 601 14 mm. The skilled person realizes that dimensions and sizes are not fixed to the above mentioned but may be varied in line with the tube dimensions onto which the attachment device F is going to be applied upon.

Figure 5:
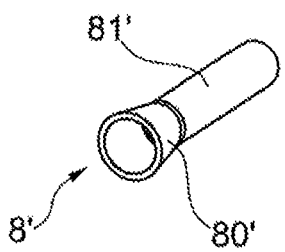
FIG. 5 shows a perspective view of an alternative barrel nut according to the invention.
Figure 6:
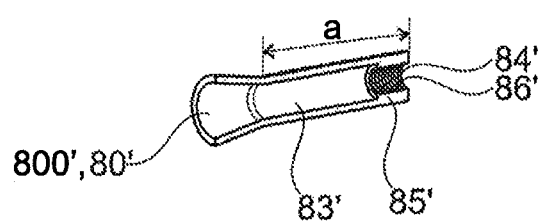
FIG. 6 shows a cross section of the barrel nut according to FIG. 5.

In FIG. 5 an alternate barrel nut 8' according to the invention is shown, even if the alternate barrel nut 8' comprises a head 80' and a from the head extending barrel 81'. In FIG. 6 a section of the barrel nut 8' is shown which also is shown in FIG. 5. Also, the alternate barrel nut 8' comprises a distally located section 85', which section 85' has a first interior diameter d which is smaller than a second interior diameter D of the remaining barrel section 83'. The distally located section 85' comprises internal threads 86'. The alternate barrel nut 8' comprises a head 80' with the shape of a frustum of a cone with its widest portion located distally from the barrel 81'. One advantage with the cone shaped head 80' is that when a screw 9 is screwed into the alternate barrel nut 8' the cone shaped head 80' is wedged into the through hole 210 of the attachment element 2 and is selflocking therein. Both the barrel nut 8 and the alternate barrel nut 8' described above are self-locking at mounting of the attachment device F with the need of just one hand which facilitates the mounting.

Figure 8:
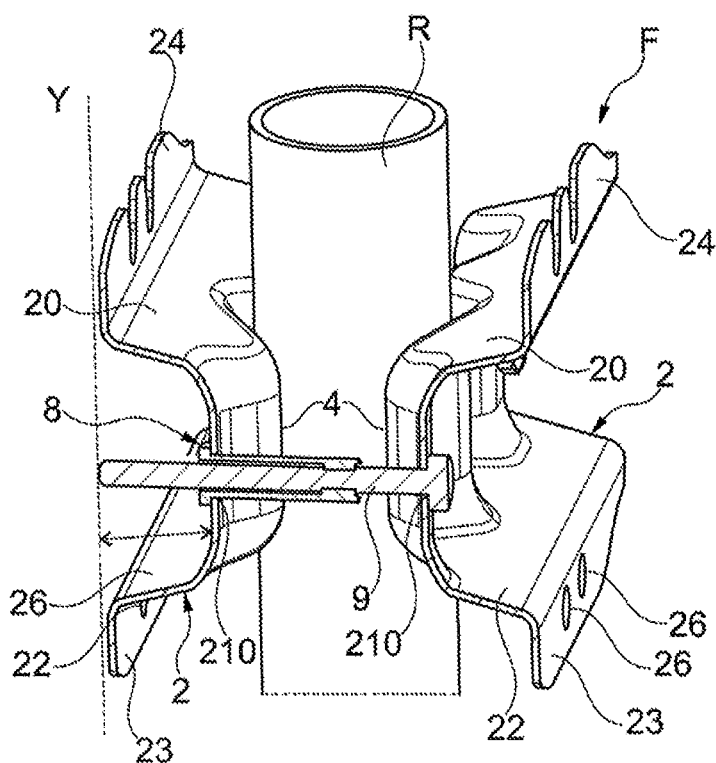
FIG. 8 shows a perspective view of an attachment device according to the invention provided on a supporting tube.
Figure 9:
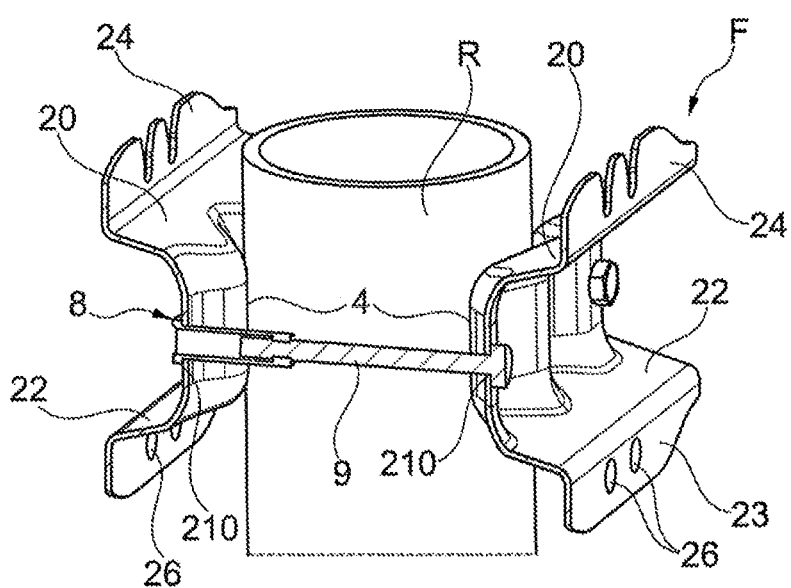
FIG. 9 shows a perspective view of the attachment device according to the invention provided on a supporting tube.

The advantage with this is that a shorter screw 9 can be used since the threads 86 are provided closer to the opposite attachment element 2 since the barrel nut 8 extends toward the opposite attachment element 2 in the area between the both attachment elements 2, shown in FIGS. 8 and 9. The barrel nut 8 has consequently the function of an extended nut. The barrel nut 8 is preferably manufactured of galvanized steel and at the galvanization the threads 86 are clogged so that these in a conventionally way must be threaded once more before usage. Traditionally, the threads must be threaded once more and then run the risk of being affected by corrosion at usage, but thanks to that the barrel nut 8 according to the invention which only is provided with threads 86 in the interior section 85 it is secured that a screw always is provided in the threaded section.

The attachment device F according to the invention accordingly comprises two attachments elements 2, two barrel nuts 8 and two screws 9. At assembly of the attachment device F on a tubular element R the attachment elements 2 are provided to be mirror-inverted on both sides of the tubular element R and be fixed thereabout by means of the barrel nuts 8 and the screws 9. The two attachment elements 2 are mirror-invertely located on each side of the tubular element R such that the centrally located wave trough 3 abuts against the tubular element R and constitute the abutting section 302 against the tube R. The tube abuts against the two opposite wall sections 30, 30' of the abutting section 302, as shown in FIGS. 8 and 9. Dependent upon the diameter of the tubular element R, the location of the abutting surface of the opposite wall portions 30, 30' is varied. The barrel nuts 8 are provided in the through holes 210 within one of the attachment elements 2 (alternatively one barrel nut 8 in each attachment element 2) and screws 9 are provided within the through hole 210 in opposite attachment element 2. Afterwards the Installer May Fasten the Screws and Fix the Attachment Device onto the Supporting Tube R.

FIGS. 8 and 9 show how the attachment device F is provided onto the tubular element R comprising different diameters. Thanks to the design of the barrel nut, shown in FIG. 8, where the tube R is provided with a diameter of 60 mm, it is shown how the screw 9 extend through the whole barrel nut 9, through both the barrel 81 and the head 80, and a distance outside this. The respective parts within the attachment device F are preferably dimensioned such that a part of the screw 9 which extend through the barrel nut 8, if any, does not extend any longer than to an imaginary line Y which extend between the upward directed mounting flange 24 and the lower mounting flange 23 of the attachment element 2. The advantage with this is that the screw does not obstruct mounting of the equipment that is to be mounted onto the attachment device F. FIG. 9 shows that the tube R has a diameter of 1 14 mm and that the screw 9 extend into and through the distally located section 85 with internal threads 86 but not through the whole barrel nut 8. Thanks to the barrel nut 8 according to the invention a screw 9 which in other cases would be too short can be used, even in that case the attachment device F is to be mounted onto a tube with a larger diameter. The same screw 9 can be used on tubes with different diameters thanks to that the barrel nut 8 extend a distance between both attachment elements 2 and operate as an extended nut.

The attachment element 2 is preferably manufactured by means of a compression moulding process which lead to advantages at the manufacturing such as that it is simple, fast and cost efficient, but manufacturing by means of bending is also an option and also moulding or other forming processes which are known to the skilled person within the field. The wavelike geometry design (3, 4) and the stiffening portions 200, 220 contribute to that the attachment element can withstand the tensional force which is generated of the screw 9 and the barrel nut 8, even when a thin sheet metal is used. The sheet metal which the attachment element 2 is manufactured from is preferably of a thickness T in the range 1-4 mm, preferably in the range 1.5-3 mm and more preferably 1.8-2.7 mm. The skilled person realizes that the invention is not limited to the range described above but may have other thicknesses if the situation so requires.

In the description above it is described how the attachment element comprises a lower mounting flange and an upper mounting flange. The skilled person realizes that the attachment element can be manufactured without the lower and/or the upper mounting flange for example if the tube is located close to a wall and equipment which are only to be hooked onto one side of the tube. The skilled person realizes that the invention is not limited to those embodiments which are described above, variations within the scope of protection may exist without going beyond the scope of the invention. For example, the attachment element may be manufactured by combining various forming processes and it is also possible to bring together a number of parts for example by means of welding. The number of wave crests/wave troughs of the spacer element can be varied and the dimensions of the different parts described above can be varied according to present conditions. It is understood that the geometry and the hole pattern of the mounting flange may have other designs than the above described and is in this context dependent on which equipment that is to be provided onto the attachment device.

As to the barrel nut described above it is a galvanized barrel nut but the skilled person realizes that all conventional coating methods for nuts can be eligible likewise it is possible to manufacture the barrel nut from stainless steel or completely untreatened if desired.

Above it is described that numeral advantages are obtained by using the attachment element according to the invention at mounting onto a tubular element. The use of the attachment element is not limited to the above described but may also be used for mounting on a wall when the attachment element has a stabile design which allows a rigid mounting on the wall.

The invention claimed is:
1. An attachment device to assemble onto a tubular element, the attachment device comprising:
   two attachment elements, each of the two attachment elements including:
      an upper assembly sheet metal that includes at its outer end a transversal, upwardly directed mounting flange that includes a cut out geometry,
      a lower sheet metal,
      a spacer element to link the upper assembly sheet metal together with the lower sheet metal in their interior ends, the spacer element including oval through holes provided on both sides of an abutting section of the tubular element, and two galvanized barrel nuts, wherein
   each galvanized barrel nut includes a head and a barrel extending from the head,
   a distally located section of the barrel has a first interior diameter that is smaller than a second interior diameter at a remaining barrel section and the distally located section includes internal threads,
   the barrel includes two external opposite chamfered planes that extend from an interior surface of the head along an entirety of the barrel, the chamfered planes fit into longer sides of the oval through holes, and the attachment elements are provided to be mirror-inverted on both sides of the tubular element and to be fixed by the barrel nuts provided via the oval through holes of the attachment elements and associated screws provided opposite the oval through holes of the attachment elements.

2. The attachment device according to claim 1, wherein the distally located section constitute max 50% of the length of the barrel more preferably max 30% of the length of the barrel.

3. The attachment device according to claim 1, wherein the threads are not galvanized.

4. The attachment device according to claim 1, wherein the head has the shape of a frustum of a cone of which the widest portion is distally located from the barrel.

\* \* \* \* \*